Nov. 12, 1935.   J. J. MASCUCH   2,020,473

PORTABLE CRIMPING TOOL

Filed May 26, 1933

INVENTOR
JOSEPH. J. MASCUCH.
BY
ATTORNEY

Patented Nov. 12, 1935

2,020,473

UNITED STATES PATENT OFFICE 2,020,473

PORTABLE CRIMPING TOOL

Joseph J. Mascuch, Newark, N. J.

Application May 26, 1933, Serial No. 672,917

1 Claim. (Cl. 153—9)

This invention relates to a portable crimping tool.

In aircraft practice it is customary to use flexible conduits on many parts of the engine and fuselage. For instance, all the ignition wires and other wires carrying current may be enclosed in metal conduits. The gas and oil lines may be composed of flexible conduits. These conduits may be formed of a plurality of layers of metal or may be formed of rubber with a fabric covering, or may be composed of a combination of several of these materials.

The ends of the conduits are provided with metal ferrules. These ferrules are usually made of aluminum in order to decrease the weight to be carried. The ferrules must be securely attached to the ends of the conduits and must be attached so as to leave no rough portions on the inside of the conduits, and, in the case of metal conduits, the ferrules must make a good electrical contact with the body of the conduit.

In servicing aircraft in the field it often becomes necessary to replace a section of conduit. Many different lengths of conduits may be used on a single airplane. Therefore, for replacement purposes it is not practicable to carry spare conduits with ferrules on them. It is necessary to cut a section of conduit of the desired length and apply a ferrule to the end of the section so cut. This same condition arises not only for emergency repairs but also in the normal overhaul of an airplane, and in the initial assembly where, by reason of variations in different types of airplanes, it is necessary to shorten one or more conduits.

Under these conditions it is not possible to take the section of conduit to the repair shop to apply the ferrule. The ferrule must be properly attached to the conduit in the field. It is not possible to use solder to hold the ferrule to the conduit for several reasons. If the ferrule and conduit are made of aluminum or if the conduit has a rubber covering it cannot be soldered. Where solderable metals are used the solder leaves a rough area which is very undesirable. On the conduits enclosing the ignition wires it is essential that the inside of the conduit be perfectly smooth, so that solder cannot be used, as any rough or projecting area will cut the insulation of the wires and permit leakage of high tension current.

Experience has shown that crimping is the best method of securing the ferrules to the conduits. However, when the repairs are made the airplane may be far removed from a shop equipped with a crimping machine.

Therefore, the broad object of this invention is to provide a simple, portable, hand-operated swaging tool which may be used anywhere.

A further object of the invention is to produce a tool which will be small and of light weight material so that it may be carried in an airplane as part of the tool kit.

A further object of the invention is to produce a tool which will be simple and positive in its operation, and which may be produced at a price which will permit each mechanic to own a tool instead of having a crimping tool as part of the stationary equipment of the repair shop.

It will be obvious that the tool may be used for crimping many different articles and the reference herein to crimping ferrules on conduits for airplanes is not to be construed as a limitation of the use of the tool.

The invention consists of the construction, combination and arrangement of parts as herein illustrated, described and claimed.

In the accompanying drawing, forming part hereof, is illustrated one form of embodiment of the invention, in which drawing similar reference characters designate corresponding parts, and in which.

Figure 1:
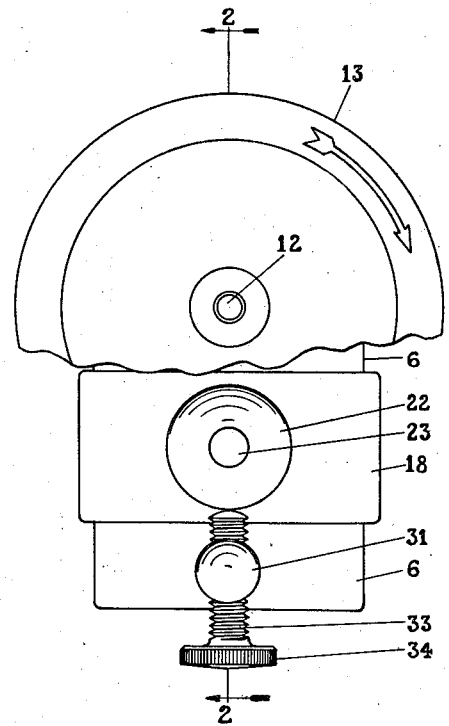
Figure 1 is a front elevation, partly broken away.

Referring to the drawing, 6 designates a base plate or supporting member on which is carried the elements of the tool. The plate 6, and, in fact, all of the parts of the tool except the forming dies, may be made of a light metal such as aluminum to reduce the weight of the tool. Intermediate of its ends the plate 6 is provided with an elongated opening 7. Near its top the plate 6 is provided with a smaller opening 8 and a second opening 9 is provided near the bottom of the plate 6.

Disposed in the opening 8 is a sleeve 10. The sleeve 10 may be held by friction or otherwise secured to the plate 6. Carried in the sleeve 10 is a shaft 11 having a reduced screw-threaded end 12 on which is carried an operating member 13. The opposite end of the shaft 11 is provided with a reduced portion 14 on which is carried a circular forming die 15. The die 15 is provided with a peripheral flange or lip 16 at its outer end and with a recessed portion 17 at its opposite end adjacent the plate 6.

Slidably disposed on the central portion of the plate 6 is a plate 18 having complementary guide flanges 19 which engage the sides of the plate 6. The plate 18 is provided with an interiorly screw-threaded opening 20 in which is disposed the exteriorly screw-threaded wall 21 of a housing 22. The housing 22 is provided with an opening 23 at the end thereof.

Disposed in the housing 22 is a shaft 24 carried in ball bearings 25 and provided with a screw-threaded end 25a. A spacer 26 is carried by the shaft 24 between the bearings 25. Carried by the shaft 24 is an interiorly screw-threaded mandrel or die 27 provided with a circumferential rib 28. The member 27 serves both as a mandrel and a die. A ferrule is supported by the member 27 while the rib 28 acts upon the inner face of one edge of the ferrule. The rib 28 is located opposite a point intermediate the lip 16 and the recess 17 on the die 15. The sleeve 27 is slotted at 29 and the shaft 24 is slotted at 30 so that these members may be engaged by tools to screw the sleeve 27 to the shaft 24.

Carried in the opening 9 in the plate 6 is a boss 31 having a peened-out portion 32 to secure the boss 31 in the opening 9. The boss 31 carries a screw-threaded compression member 33, the end of which bears against the housing 22. The member 33 is provided with a head 34 adapted to be operated by hand to maintain the housing 22 in a desired spaced relation to the die 15.

Figure 4:
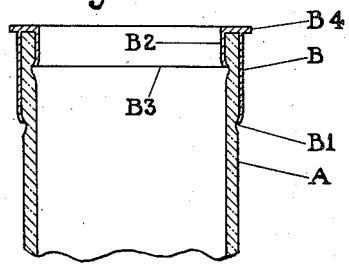
Figure 4 is a fragmentary detail in vertical section showing one type of conduit and a ferrule thereon after the ferrule has been crimped into place.
Figure 3:
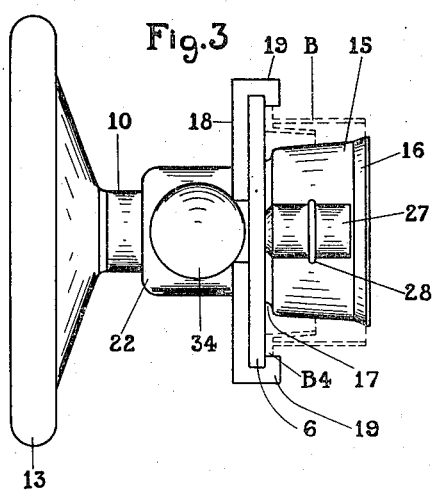
Figure 3 is a bottom plan view.

Referring to Figure 4, A designates one form of conduit provided with a ferrule B. The lower edge $B^1$ of the ferrule B is turned inward against the conduit A. The ferrule B is provided with an inner flange $B^2$ having its edge $B^3$ flared outward against the conduit A. The ferrule B is provided with a circumferential flange $B^4$ adapted to bear against a nut not described.

Figure 2:
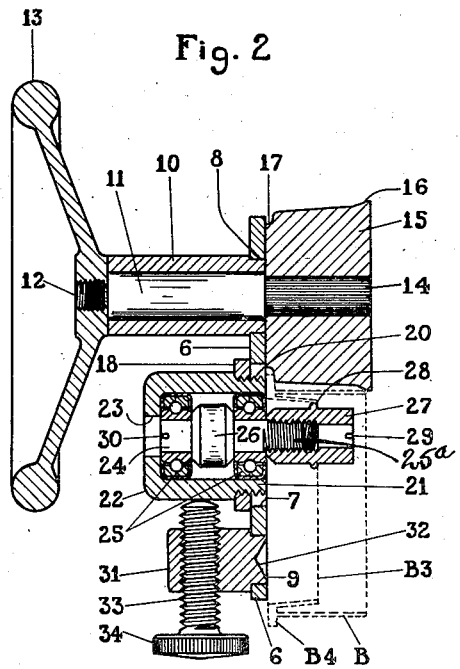
Figure 2 is a vertical section taken approximately on line 2—2 of Figure 1, looking in the direction indicated by the arrow.

The operation of the tool is as follows:

After an uncrimped ferrule B has been engaged over the end of a section of conduit A, the conduit A with the ferrule B thereon is placed over the mandrel 27, as shown by the dotted lines in Figure 2. The plate 18 carrying the housing 22 and the member 27 is moved toward the die 15. The flange $B^4$ on the ferrule B enters the recess 17 of the die 15 so that the ferrule B cannot slip from position. The compression member 33 is tightened against the housing 22 to hold the ferrule B securely between the die 15 and mandrel 27.

With the parts in this position the conduit A is held in one hand against rotation and the operating member or wheel 13 is rotated in either direction but preferably in the direction of the arrow on the member 13, which is the direction of the screw-threads which hold the parts together, so that the tool will not come apart. As the member 13 is rotated the lip 16 on the die 15 will bear against the edge $B^1$ of the ferrule B, and will force the edge $B^1$ inward. Simultaneously, the rib 28 on the mandrel 27 will bear against the edge $B^3$ on the ferrule B and force the edge $B^3$ outward. As the member 13 is rotated the tool will travel entirely around the conduit A and the ferrule B, by reason of the friction produced by the compression member 33. When one or two complete turns have been made the compression member 33 is tightened, thus moving the housing 22 upward and bringing the dies 15 and 27 closer together, to produce any desired degree of crimping of the edges $B^1$ and $B^3$.

The operation may be repeated several times, resulting in the edges $B^1$ and $B^3$ of the ferrule B being securely attached to the conduit A. When this has been done the member 33 is retracted, allowing the dies 15 and 27 to separate, and the conduit A with the ferrule B securely crimped thereto may be removed from the tool.

Where different sizes of tubing are to be operated upon or different sized ferrules applied it is necessary to use a different die 15 and the mandrel 27 having the rib 28 in a different location. However, with the construction described it is simple to interchange the die members to accommodate various sized ferrules. If it is determined that a particular tool will be used on one sized type of ferrule the mandrel 27 may be permanently secured to the shaft 24 in any suitable manner, and the die 15 secured to the shaft 11 in like manner.

Having thus fully described the invention, what is claimed as new and desired to be secured by Letters Patent is:

A portable tool for crimping a double walled ferrule to the end of a tube comprising a supporting plate, a shaft disposed through the plate, a hand wheel on one end of the shaft, a die member carried on the other end of the shaft, said die being formed with a recess adjacent the supporting plate to receive a flange on a ferrule, a second plate slidably mounted on the first plate, said second plate being formed with flanges to engage the edges of the first plate, a housing carried by the second plate, a shaft carried in bearings disposed in the housing, said shaft projecting through the housing and through a slot formed in the first supporting plate, a die carried by the last mentioned shaft and a setscrew supported from the second plate and adapted to contact the housing to limit the movement thereof in one direction.

JOSEPH J. MASCUCH.